United States Patent [19]

McCracken et al.

[11] Patent Number: 5,718,589
[45] Date of Patent: Feb. 17, 1998

[54] LEARNING ENHANCING SYSTEM, AND METHOD OF TEACHING

[76] Inventors: Jill J. McCracken; Michael L. McCracken, both of 504 W. Lakeview Dr., Springdale, Ark. 72764

[21] Appl. No.: 560,895

[22] Filed: Nov. 20, 1995

[51] Int. Cl.$^6$ ..................................................... G09B 1/06
[52] U.S. Cl. .................. 434/159; 434/156; 434/193; 2/49.1; 2/75; 2/80; 2/79
[58] Field of Search ..................... 434/159, 156, 434/188, 193; 2/49.1, 246, 908, 919, 913, 75, 80, 79

[56] References Cited

U.S. PATENT DOCUMENTS

| | | | |
|---|---|---|---|
| 2,838,758 | 6/1958 | Townley | 2/49 |
| 2,926,805 | 3/1960 | Mead | 215/11 |
| 3,608,092 | 9/1971 | Taranto | 2/49 |
| 3,777,310 | 12/1973 | Yang | 2/48 |
| 4,249,268 | 2/1981 | Berler | 2/913 X |
| 4,710,979 | 12/1987 | Bull et al. | 2/75 |
| 4,723,323 | 2/1988 | Wright, Jr. | 2/49 |
| 4,820,164 | 4/1989 | Kemper | 434/238 |
| 5,121,505 | 6/1992 | Ludmer et al. | 2/115 X |
| 5,275,818 | 1/1994 | Kind | 434/157 |
| 5,282,749 | 2/1994 | Ketch | 434/395 |
| 5,468,152 | 11/1995 | Lenart | 434/429 |

*Primary Examiner*—Jeffrey A. Smith
*Attorney, Agent, or Firm*—Ronald P. Kananen

[57] ABSTRACT

An article of clothing such as a bib, T-shirt, pants, dress, pajamas, etc. for a baby, toddler, or child having one or more inverted items, for example characters, numbers, diagrams, pictures, letters, designs, figures, or combinations thereof, on the front of the article so that, they appear right-side-up to the infant or toddler wearing the article and up-side-down to the adult or care giver. Such an article can be used to teach a child numbers, letters, pictures, the alphabet, numerical system, and the like while a child is wearing the article. It is believed that by putting the items in the proper orientation for right-side-up viewing by the child, the child may learn more quickly and not be confused when these items are shown right-side-up on the television and in reading materials. A series of articles or articles having removable and replaceable items can be used as a learning system, so that, the child, over time, can learn, for example, the entire alphabet, numbers up through 100, words, animals, etc.

12 Claims, 6 Drawing Sheets

FIG. 13

LEARNING ENHANCING SYSTEM, AND METHOD OF TEACHING

BACKGROUND OF THE INVENTION

The present invention is directed to clothing, garments, and/or accessories, and more particularly concerns a learning enhancing article of clothing, garment, and/or accessory having intentionally inverted numbers, letters, numerals, characters, words, designs, figures, objects, pictorial representations, combinations thereof and the like thereon, systems, and methods of teaching therewith.

Figure 1:
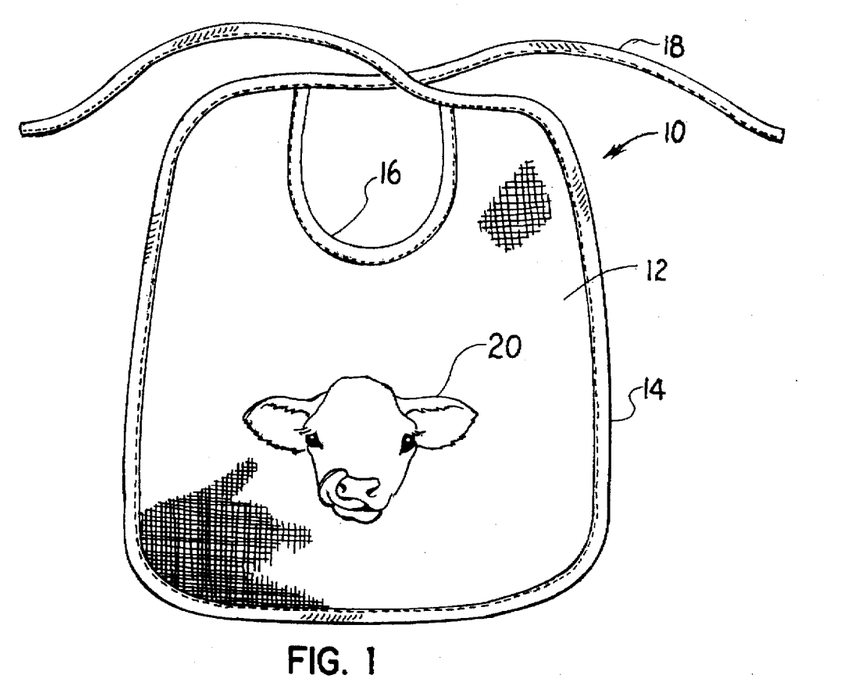
FIG. 1 is a front plan view illustration of a conventional bib (prior art) having a right-side-up oriented design on the front face thereof.

As shown in FIG. 1 of the drawings, a conventional (prior art) bib generally designated by the reference numeral 10 is shown to include a cloth front panel 12, a moisture-proof back panel 14, a neck opening 16, and releasable securing ties 18. The bib 10 also includes a design 20 on the front thereof in a right-side-up orientation when viewed by someone other than the child or infant wearing the bib. Other conventional bibs include a plurality of designs or figures, for example, balloons or clowns, presented in a random or haphazard orientation on the bib. When such a conventional bib is placed in position around a child's neck and secured for use, the child looks down upon the designs or figures on the bib and they appear upside-down to the child. The conventional orientation of one or more of the designs or other items on the face of the bib may confuse or slow the learning process of the child wearing the bib since these items are perceived upside-down or inverted by the wearer.

Hence, there is a need for an improved article of clothing, garment, accessory and the like which includes one or more intentionally inverted or upside-down oriented designs, letters, numbers, characters, words, pictorial representations, figures, objects, array, pattern, or combinations thereof which appear right-side-up to the person or child wearing the article.

SUMMARY OF THE INVENTION

In accordance with the present invention, an article of clothing, garment, accessory, or the like is provided which includes one or more intentionally inverted or upside-down oriented items, array, or pattern, including numbers, letters, words, pictures, designs, figures, objects, pictorial representations, or combinations thereof on at least the front face thereof to be viewed in a right-side-up orientation by the wearer of the article to enhance learning, facilitate teaching, or reduce confusion on the part of the wearer. Also in accordance with the present invention, an improved outfit is provided which includes a plurality of articles, garments, accessories, and/or the like including one or more inverted items such as letters, numbers, characters, words, designs, pictures, figures, objects, or combinations thereof on at least the front face of each article to be viewed in an upright orientation by the person or child wearing the outfit.

Further in accordance with the present invention, a system of a series or sequence of articles, garments, and/or accessories having the inverted items on at least the front face thereof is provided to be used sequentially to facilitate the learning of, for example, the alphabet, numerical system, objects, animals, words, etc. by the wearer. Moreover, in accordance with the present invention, a method of teaching is provided which utilizes the above-described articles, garments, accessories, outfits, and/or system to facilitate the learning process of a child, toddler, infant, handicapped person, or learning disabled child or adult.

In accordance with one embodiment of the present invention, a learning enhancing bib is provided which includes at least one intentionally inverted item on the front face thereof to be viewed by the wearer in an upright orientation and viewed by others in an upside-down or inverted orientation. The item may be one or more figures, letters, numbers, words, pictures, designs, objects, or combinations thereof.

In accordance with a particular example of the present invention, a series of four bibs constituting a system includes a first bib having on the front face thereof the inverted numbers 1, 2, and 3, a second bib having on the front face thereof the inverted numbers 4, 5, and 6, a third bib having on the front face thereof the inverted numbers 7, 8, and 9, and a fourth bib having on the front face thereof the inverted number 10. These bibs are designed to be worn sequentially in order to enhance or facilitate the learning of the numbers 1-10. In accordance with another particular example of the present invention, a series of learning enhancing bibs includes sequential groupings of letters of the alphabet to facilitate the learning of the alphabet. In accordance with still yet another particular example of the present invention, a series of bibs includes animals typically found at the zoo.

In accordance with another exemplary embodiment of the present invention, a learning enhancing shirt includes at least one inverted item on the front face and/or sleeves thereof to be viewed by the wearer in an upright orientation and viewed by others in an upside-down or inverted orientation. The item may be one or more figures, letters, numbers, words, pictures, designs, objects or combinations thereof. In accordance with a particular example of the present invention, a series of such shirts make up a system.

In accordance with still another exemplary embodiment of the present invention, a learning enhancing outfit includes a shirt, pants, pajamas and/or bib each having at least one inverted item on the front face thereof to be viewed by the wearer in an upright orientation and viewed by others in an upside-down or inverted orientation. The item may be one or more figures, letters, numbers, words, pictures, designs, objects, or combinations thereof. In accordance with a particular example of the present invention, a series of such outfits constitute a system.

In accordance with another exemplary embodiment of the present invention, a learning enhancing layette, skirt, or dress, includes at least one inverted item on the front face thereof to be viewed by the wearer in an upright orientation and viewed by others in an upside-down or inverted orientation. The item may be one or more figures, letters, numbers, words, pictures, designs, objects, or combinations thereof. In accordance with a particular example of the present invention, a series of such garments constitute a system.

In accordance with yet another exemplary embodiment of the present invention, a learning enhancing kit or system includes an article, for example a bib, a plurality of items such as numbers, letters, words, designs, pictures, objects, or combinations thereof, and instructions for attaching each of the items to the front face of the article in an inverted or upside-down orientation.

In accordance with still another exemplary embodiment of the present invention, a kit for converting a conventional article of clothing, garment, accessory, or the like, to a learning enhancing article includes a plurality of items such as numbers, letters, words, designs, pictures, objects, or combinations thereof, and means for releasably attaching one or more of the items to at least the front face of an article of clothing, garment, accessory, or the like, with the item in an inverted or upside-down orientation.

The principal object of the present invention is the provision of an article of clothing, garment, or accessory having on at least the front face thereof one or more intentionally inverted items, such as numbers, letters, characters, numerals, words, figures, designs, pictorial representations, objects, array, pattern and/or combinations thereof.

Another object of the present invention is the provision of a learning enhancing bib, shirt, pants, layette, dress, pajamas, and the like, having on at least the front face thereof one or more inverted items.

A still further object of the present invention is the provision of an outfit including a plurality of articles of clothing, garments, or accessories having on at least the front face thereof, one or more inverted items.

Yet another object of the present invention is the provision of a system including a plurality or series of learning enhancing articles having one or more inverted items thereon.

Still yet another object of the present invention is the provision of a kit for converting a conventional article of clothing, garment, or accessory to a learning enhancing article.

Another object of the present invention is the provision of a method of teaching incorporating one or more learning enhancing articles, garments, accessories, system, outfit, or combinations thereof to enhance and facilitate the teaching of numbers, letters, numerical system, alphabet, words, animals, items, objects, or combinations thereof.

Other objects and further scope of the applicability of the present invention will become apparent from the detailed description to follow, taken in conjunction with accompanying drawings wherein like parts are designated by like reference numerals.

DETAILED DESCRIPTION OF THE PREFERRED EMBODIMENTS

Figure 2:
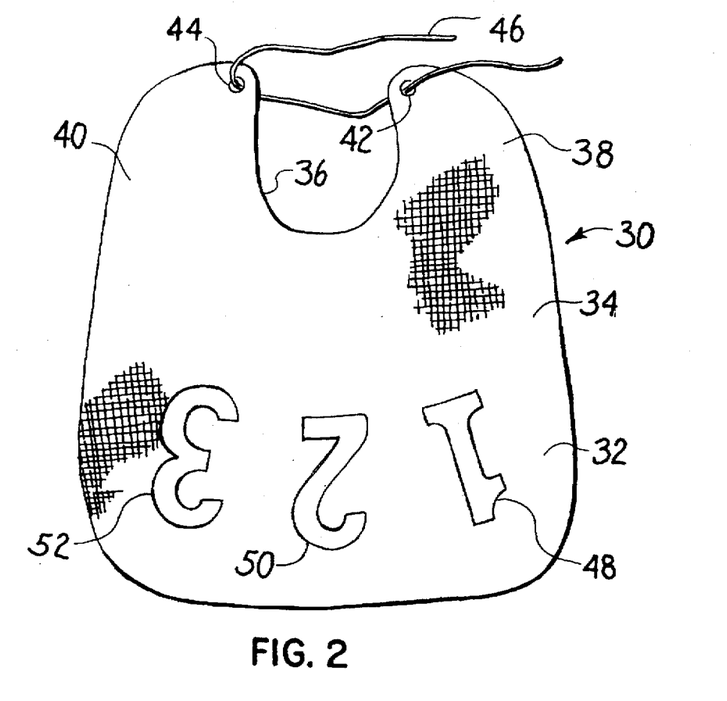
FIGS. 2-4 are front plan view representations of learning enhancing bibs in accordance with exemplary embodiments of the present invention.
Figure 3:
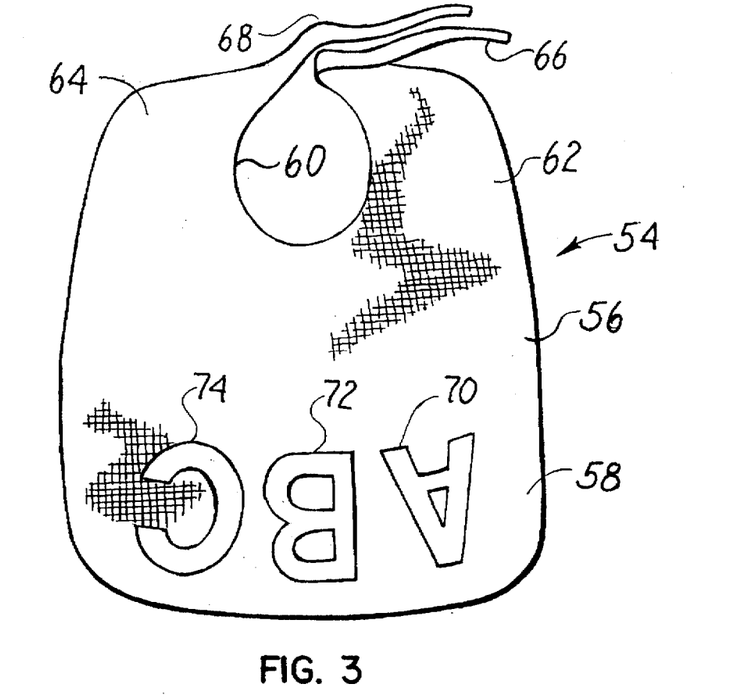
Figure 4:
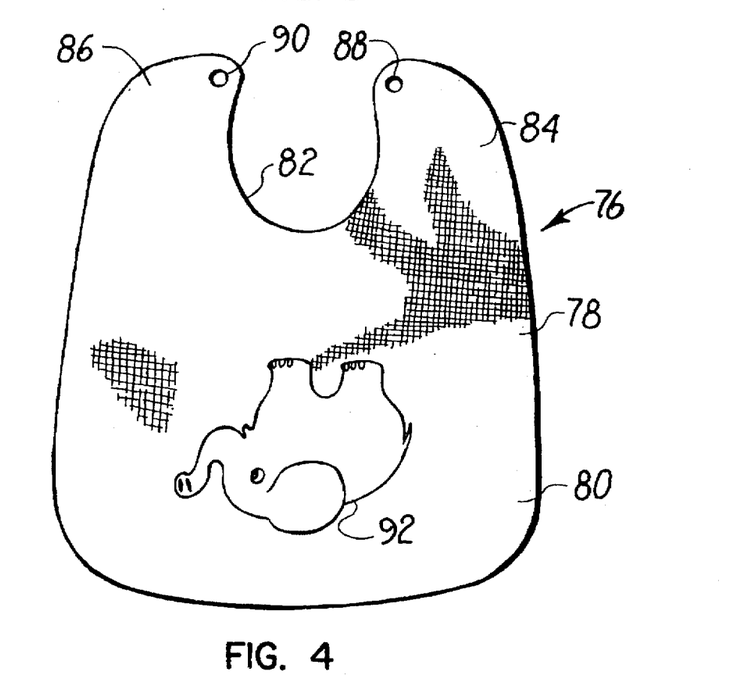

As shown in FIGS. 2-4 of the drawings and in accordance with exemplary embodiments of the present invention, respective bibs for babies, toddlers, infants, young children, etc. have one or more items including characters, numbers, letters, designs, figures, objects, diagrams, pictures, combinations thereof, and the like inverted or upside-down on the bib so that they appear right-side-up to the infant or child wearing the bib, and upside-down to others, for example, the adult or person caring for the child. Such a bib can be used to teach a child numbers, letters, animals, pictures, the alphabet, numerical system, and the like, while a child is wearing the bib, and with the items in the proper orientation for viewing by the child.

It is believed that, by putting one or more inverted items on the front surface of the bib in the proper orientation for right-side-up viewing by the child or person wearing the bib, the child may learn more quickly and not be confused when these items are shown right-side-up on television, in reading material, and the like. A series of bibs or bibs having removable or replaceable items, for example letters or characters, can be used as a learning system, so that the child over time can learn an entire alphabet, numbers up through 100, barnyard animals, zoo-type animals, etc.

More particularly, in accordance with the exemplary embodiment of the present invention as shown in FIG. 2 of the drawings, a learning enhancing bib generally designated by the reference numeral 30 includes a bib body 32 having a front surface or panel 34, a neck opening 36, side wing portions 38 and 40, each having a respective opening or button hole 42 and 44 which receives a button on an underlying garment or an elongate thread, cord, ribbon, tie, or the like 46, for releasably securing the bib under a child's chin at meal time, study time, or at other times to prevent the child from drooling on their clothing. One or more inverted items 48, 50, and 52 are attached to, printed on, dyed, sewn, embroidered, stitched, applied, embossed, or otherwise presented on the front surface 34 of main body 32 of bib 30.

In accordance with the embodiment shown in FIG. 2 of the drawings, the inverted items 48, 50, and 52 are the numbers 1, 2, and 3, respectively. Although the items 48, 50 and 52 of bib 30 are three numbers or numerals, it is to be understood that the present invention encompasses the use of one or more inverted items including characters, numbers, letters, designs, figures, objects, diagrams, pictures, combinations, arrays, patterns, etc. Also, the items of the present invention may be letters or numbers from, for example, the English, Spanish, Greek, French, German, or other alphabet or numerical system.

Also, it is to be understood that the present invention is not limited to any particular shape, style or make of bib or bib attachment or securement. For example, the bib may include snaps, buttons, ties, strings, snap buttons, attached strings, releasable fasteners such as VELCRO brand straps, or the like, for securing the bib in position, and the bib may have a rectangular, circular, oval or other shape to the bib body.

It is contemplated that the bib 30 may be the first bib in a series or system of bibs having sequential groupings, arrays, or patterns of numbers thereon. For example, a series including bib 30, a second bib having the inverted numbers 4, 5, and 6, a third bib having the inverted numbers 7, 8, and 9, and a fourth bib having the inverted number 10 thereon, may be used as a bib system for facilitating the teaching of the numbers 1-10 to the child, infant, toddler, or the like, wearing the bibs. Repeated sequential wearing of the bibs in the series is believed to reinforce the relative order of the numbers and thereby further enhance the learning experience and facilitate the teaching of the numbers to the child.

In accordance with a particular example of the present invention, the bib may include a main body portion which is larger than that of a conventional or typical child's bib to provide a larger surface area for attaching, embossing, painting, inking, printing, dying, sewing, stitching, applying, or otherwise presenting inverted items thereon and increases the usefulness of the bib.

It is to be understood that the bib 30 may be formed of a variety of materials to provide a disposable, washable, reusable, and/or waterproof bib. Alternatively, the front panel may be made of a loose woven loop material so that the inverted items 48, 50, and 52 may be releasably attached thereto by having hook-type fastening elements such as VELCRO brand hook-type fastening tapes on the back surface of each of the items 48, 50, and 52. The hook-type releasable fastening material engages the loose woven material of the front panel 34 and provides a releasable connection or coupling therebetween. A disposable bib may be formed of a paper material having the inverted items 48, 50, and 52 printed thereon. Also, it is envisioned that the inverted items 48, 50, and 52 may actually be openings or cutouts in the main body 32 with the openings defining the items. Also, it is contemplated that the bib 30 may be reversible and have one or more inverted items on the back surface thereof. The items on the back may be the same as or different than the items on the front surface to further enhance the usefulness of the bib.

In accordance with the exemplary embodiment of the present invention shown in FIG. 3 of the drawings, a learning enhancing bib generally designated by the reference numeral 54 includes a front surface or panel 56 having a main body portion 58 and neck opening 60, right and left wing portions 62 and 64, and right and left ties or strings 66 and 68. One or more inverted items 70, 72, and 74 are attached, embossed, inked, painted, dyed, sewn, embroidered, stitched, applied, etc., to the front surface or panel 56 of bib 54. In the particular embodiment shown in FIG. 3, the inverted items 70, 72, and 74 are the capital letters, A, B, and C. When the bib 54 is worn by a child, infant, toddler, or the like, the items 70, 72, and 74 appear right-side-up to the wearer, and upside-down to others, for example, the parent or guardian taking care of or trying to teach the child.

Again, it is contemplated that the bib 56 may be a first bib in a series of bibs, each having a sequential grouping of letters thereon to facilitate the teaching of the alphabet to the child. Also, it is contemplated that the bib 54 may have one or more inverted items on the rear surface or panel thereof to further increase the usefulness of the bib. Like the bib 30, the bib 54 may be disposable, reusable, or made of a material to provide for the attachment and detachment of the inverted items to the front and/or rear surfaces thereof.

In accordance with a particular example of the present invention, the main body portion of the bib may be enlarged as compared to conventional bibs so as to provide an increased surface area for the placement of additional or enlarged inverted items thereon.

In accordance with still yet another exemplary embodiment of the present invention as shown in FIG. 4 of the drawings, a learning enhancing bib generally designated by the reference numeral 76 includes a front panel or surface 78 having a main body portion 80, a neck opening 82, right and left hand wings 84 and 86, and complimentary snap components 88 and 90 providing for releasable coupling of the components 88 and 90 and attachment of the bib 76 around the neck and under the chin of a child, infant, or the like. An inverted item 92 is attached, embossed, inked, painted, dyed, sewn, embroidered, stitched, applied, affixed, or otherwise presented on the front surface of main body 80 of bib 76. The item 92 is an animal, and more particularly, a young elephant.

Again, it is contemplated that the bib 76 may be a first bib in a series or system of bibs each having thereon a different inverted item, for example, a different animal found in a typical zoo, or a different animal found in a barnyard to facilitate the teaching of the different animals to the child, toddler, or other person wearing the bibs.

Also, it is contemplated that the bib 76 may be disposable, reusable, waterproof, and/or formed of a material which provides for the releasable attachment or detachment, or coupling of one or more inverted items thereto.

Figure 5:
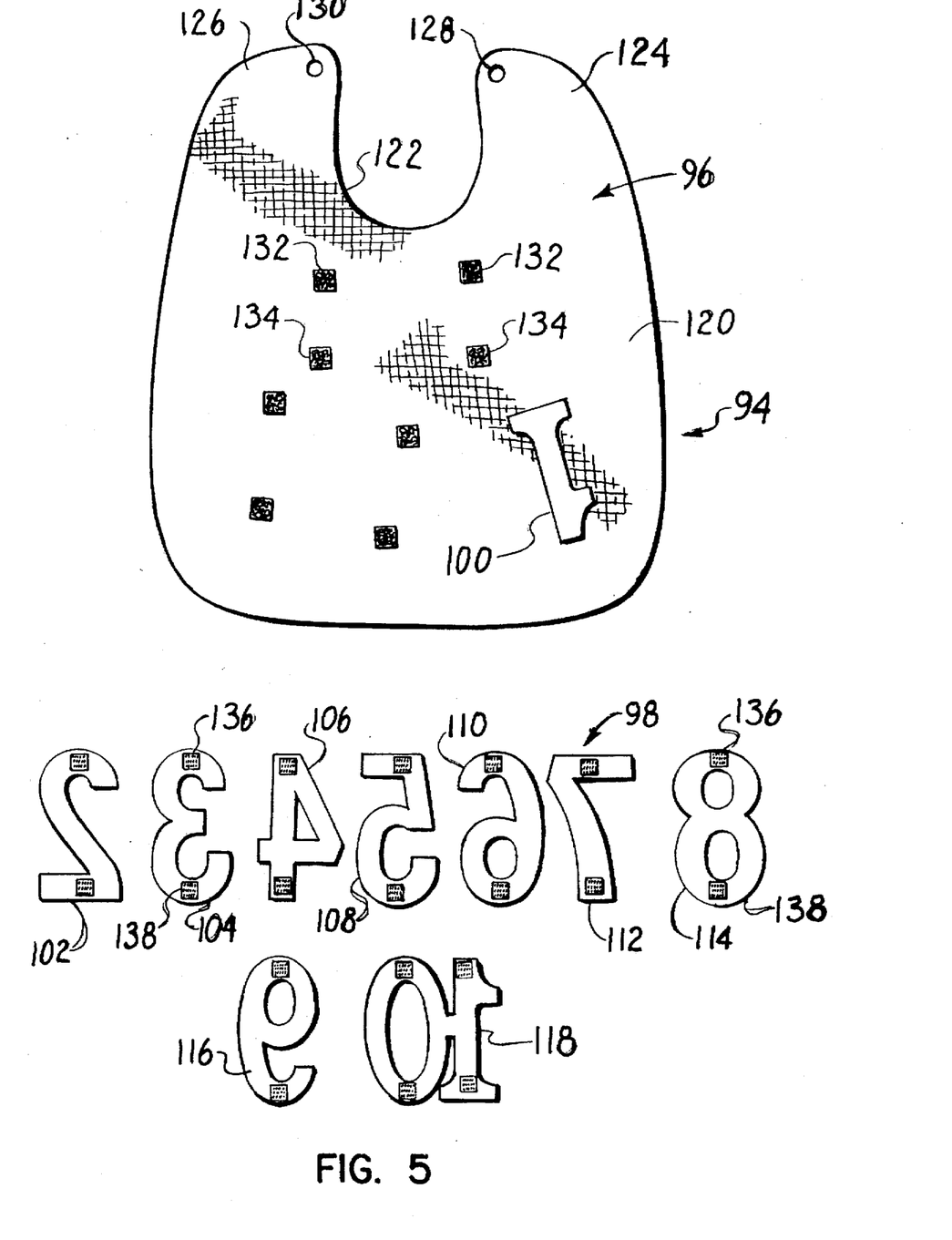
FIG. 5 is a plan view illustration of a learning enhancing bib, system or kit with the bib body and numeral 1 shown in front plan view and the numerals 2-10 shown in rear plan view.

As shown in FIG. 5 of the drawings in accordance with another exemplary embodiment of the present invention, a learning enhancing bib kit or system generally designated by the reference numeral 94, is shown to include a bib 96, and a set 98 of a plurality of detachable items 100–118 which are adapted to be releasably attached to the bib in an inverted or upside-down orientation. The bib 96 includes a front panel or surface 120, a neck opening 122, right and left wings 124 and 126 and respective snap components 128 and 130. Attached to the front surface 120 of bib 96 are a plurality of pairs of patches or sections of releasable coupling or mating material 132 and 134, such as VELCRO brand filamentary hook tape segment pairs, which provide for detachable attachment or coupling of each of the inverted items 100–118 by corresponding pairs of mating or coupling material patches or segments 136 and 138, such as VELCRO brand loop tape segment pairs, attached to the rear surface of each of the items 100–118 in position to mate with and couple with the patches or segments 132 and 134.

As shown in FIG. 5 of the drawings, the item 100 is the numeral 1 and is attached to the front surface 120 of bib 96 with the 1 in an inverted or upside-down orientation. Similarly, four other items 102–118 may be attached to the remaining pairs of securing elements 132 and 134.

It is preferred that the bib 96 and set 98 of items 100–118 be made of a relatively sturdy, reusable, washable, material or cloth which provides for many uses of the kit or system 94 and allows for sanitation thereof by washing.

Although the items 100–118 shown in FIG. 5 of the drawings are the numerals 1–10, it is to be understood that other items such as letters, words, pictures, designs, figures, objects, etc., may be used as the items which are placed on the bib 96 in an inverted or upside-down orientation which appears right-side-up to the child or infant wearing the bib 96. The items 100–118 may be attached to the bib 96 in a variety of sequences and groupings to facilitate the teaching of numbers, letters, words, alphabet, objects, animals, or the like, to the child or infant wearing the bib 96. Also, at advanced ages, the child or other person wearing the bib 96 may become involved in the attachment and detachment of the items to the bib and further enhance the learning and teaching processes.

Figure 6:
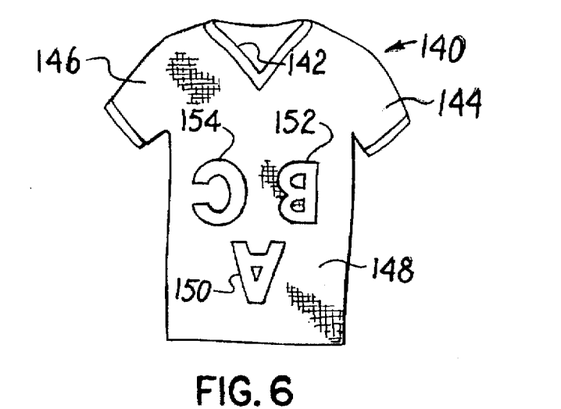
FIGS. 6-8 are front plan view representations of different exemplary embodiments of learning enhancing shirts in accordance with the present invention.
Figure 7:
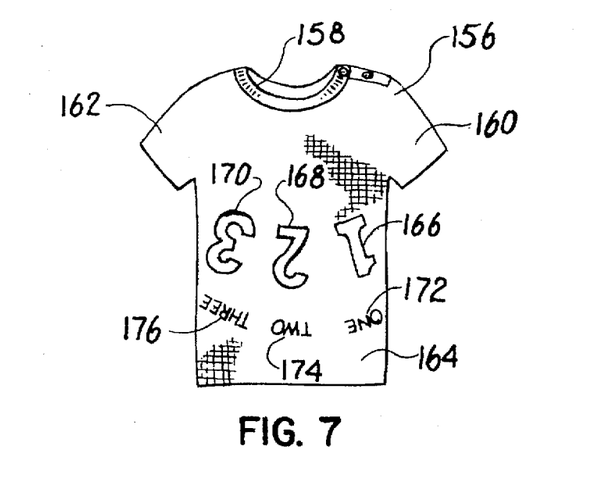
Figure 8:
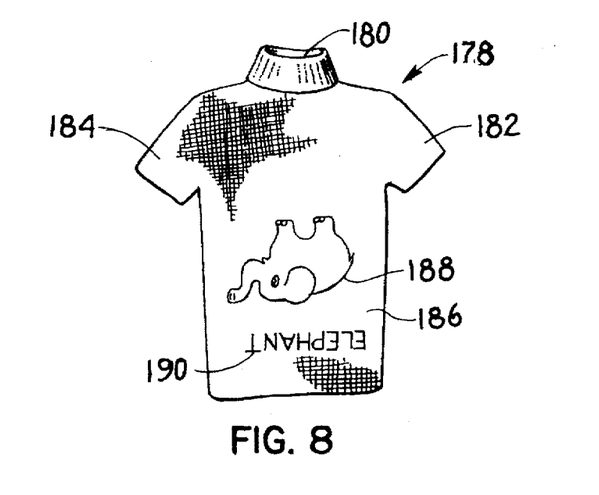
Figure 9:
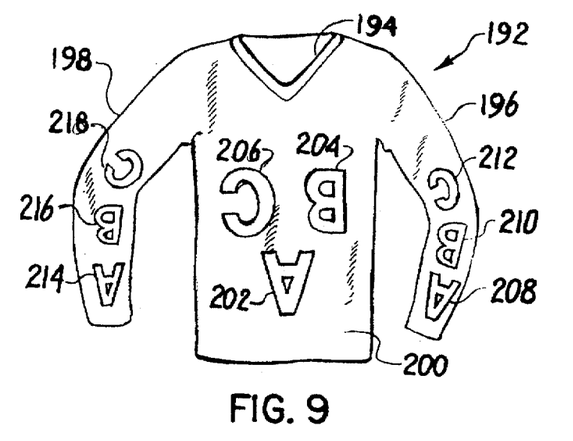
FIGS. 9-11 are front plan view representations of learning enhancing long sleeve shirts in accordance with different exemplary embodiments of the present invention.
Figure 10:
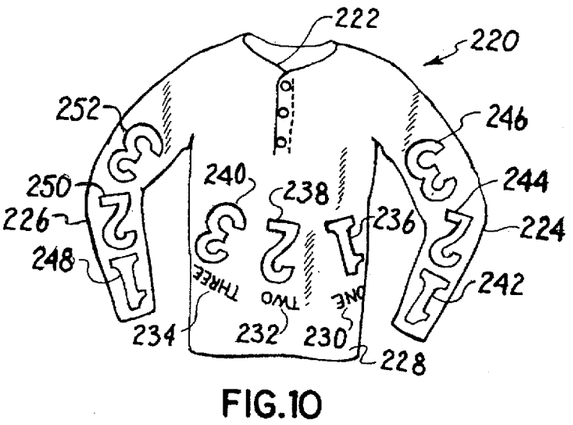
Figure 11:
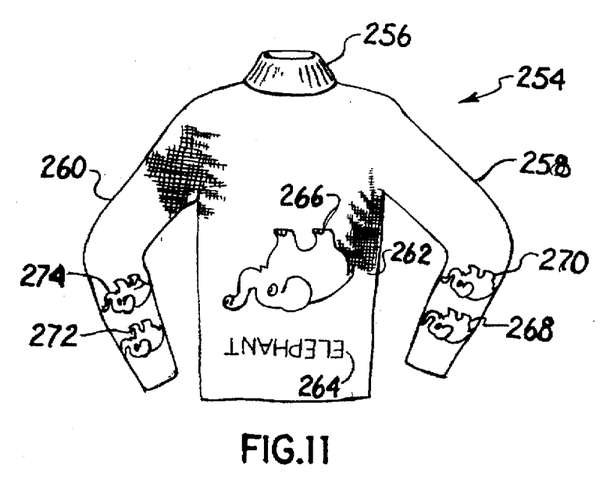

Like the bibs shown in FIGS. 1–5 of the drawings, the shirts, pants, and layette or dress shown in FIGS. 6–13 of the drawings have one or more intentionally inverted items on the front surface thereof which appear right side up to the wearer of the garment or article and appear upside-down or inverted to others. With reference to FIGS. 6–8 of the drawings, the articles of clothing or garments are short-sleeved shirts or blouses. With reference to FIGS. 9–11 of the drawings, the articles or garments are long-sleeved shirts or blouses.

More particularly, as shown in FIG. 6 of the drawings and in accordance with an exemplary embodiment of the present invention, a learning enhancing shirt or T-shirt generally designated by the reference numeral 140 includes a V-neck 142, sleeves 144 and 146, and a main body or torso portion 148. One or more inverted items 150, 152, and 154 are attached, embossed, inked, painted, dyed, sewn, embroidered, stitched, applied, or cut out of the front surface of main body 148 of shirt 140. The items 150–154 are shown as the capital letters A, B, and C.

In accordance with the exemplary embodiment shown in FIG. 7 of the drawings, a shirt generally designated 156 includes a round neck 158, sleeves 160 and 162, and a main body or torso portion 164. Attached, embroidered, inked, painted, printed, dyed, sewn, stitched, applied, or cut out from the front surface of main body portion 164 are one or more inverted items 166–176. The items 166 through 170 are shown as the numerals 1–3, and the items 172–176 are shown as the words ONE, TWO, and THREE.

In accordance with the exemplary embodiment shown in FIG. 8 of the drawings, a shirt generally designated 178 includes a turtleneck 180, sleeves 182 and 184, and a torso or main body portion 186. One or more inverted items 188 and 190 are attached, embossed, inked, painted, printed, dyed, sewn, embroidered, stitched, applied or otherwise presented on the front surface of shirt 178. Item 188 is a pictorial representation of an elephant and item 190 is the word ELEPHANT.

The inverted items 150–154, 166–176, and 188–190 are positioned on the shirts 140, 156, and 178 so that when the shirt is worn by a child or infant, he or she can look down and see the item or items right-side-up. It is believed that this will increase the child's ability to learn the numbers, letters, words, and/or to identify the objects. It is contemplated that the items can be detachable and releasably attached to the front of the shirts by filamentary hook and loop material such as VELCRO brand fastening tapes. It is to be understood that the inverted items of the present invention are not limited to the examples shown in FIGS. 6–8 of the drawings, but can include inverted, numbers, letters, words, designs, objects, pictures, figures, and the like.

Also, it is to be understood that the shirts 140, 156, and 178 shown in FIGS. 6–8 of the drawings may be the first in a series of shirts used to teach the child the entire alphabet, numerical system and/or to identify many objects and words.

FIGS. 9–11 of the drawings depict exemplary embodiments of improved children's or infant's long-sleeved shirts which are believed to increase the child's ability to learn the alphabet, numerical system, to identify objects with pictorial representations, etc. The shirts have items such as letters, numbers, figures, designs, or combinations thereof placed so that when the child or infant is wearing the shirt, he or she can look down and see the items right-side-up. Also, items including letters, numbers, figures, designs, or combinations thereof can be placed inverted on the sleeves of the shirt so that when the child or infant looks down at the sleeves, the items appear right-side-up.

With reference to FIG. 9 of the drawings, a long-sleeved shirt generally designated by the reference numeral 192 is shown to include a V-neck 194, sleeves 196 and 198, and a main body or torso portion 200. One or more relatively large sized inverted items 202, 204, and 206 are placed, attached, embossed, inked, painted, printed, dyed, sewn, embroidered, stitched, applied, or otherwise presented on the front surface of main body portion 200. One or more smaller sized inverted items 208, 210, and 212 are placed on sleeve 196 and one or more inverted items 214, 216, and 218 are placed on sleeve 198. The inverted items 208–218 are placed, embossed, attached, inked, painted, printed, dyed, sewn, embroidered, stitched, applied, or otherwise presented on the respective sleeves. In accordance with the shown embodiment, the inverted items are the capital letters A, B, and C.

As shown in FIG. 10 of the drawings and in accordance with another exemplary embodiment of the present invention, a long-sleeved shirt generally designated by the reference numeral 220 includes a button collar 222, sleeves 224 and 226, and a main body or torso portion 228. One or more inverted items 230, 232, 234, 236, 238, and 240 are located on the front of the main body portion 228 of shirt 220. Likewise, one or more inverted items 242, 244, and 246 are located on sleeve 224, and one or more inverted items 248, 250, and 252 are located on sleeve 226. It is to be understood that the inverted items 230–252 are placed, located, embossed, inked, painted, printed, dyed, sewn, embroidered, stitched, applied, or otherwise presented on the front surface of the main body 228 and sleeves 224 and 226 so that, when a child or infant is wearing the shirt, he or she can look down and see the items right-side-up.

In accordance with yet another exemplary embodiment of the present invention as shown in FIG. 11 of the drawings, a long-sleeved shirt generally designated by the reference numeral 254 includes a turtleneck 256, respective sleeves 258 and 260, and a main body or torso portion 262. One or more inverted items 264, 266, are located on the front surface of main body portion 262 of shirt 254 in a position to be viewed by the child or infant wearing the shirt. Similarly, one or more inverted items 268, 270, are located on sleeve 258, and one or more inverted items 272 and 274 are located on sleeve 260 in a position to be viewed by the child or infant wearing the shirt. It is to be understood that the inverted items 264–274 are placed, located, attached, embossed, inked, painted, screen printed, dyed, sewn, embroidered, stitched, applied or otherwise presented on the front surface of the shirt 254 or sleeves 258 and 260 so that, when the child or infant is wearing the shirt, they can look down and see the items right-side-up. Again, these inverted items may be detachable and releasably attached to the shirt 254 by respective mating or coupling surfaces such as synthetic filamentary hook and loop materials.

Also, it is to be understood that the shirts 192, 220, and 254 may be disposable, reusable, washable, waterproof, and the like, depending on the particular material chosen for construction thereof.

Also, in accordance with the present invention, it is contemplated that each of the shirts 192, 220, and 254 may be one in a series or system of shirts used to increase the ability of a child, toddler, infant, learning disabled adult, handicapped person, or illiterate person to learn and to facilitate the teaching of numbers, letters, the alphabet, numerical system, words, and/or to identify objects. Such a series of shirts or shirts having detachable and replaceable inverted items can be used as a system for enhancing the wearers learning ability and as a method of teaching.

Figure 12:
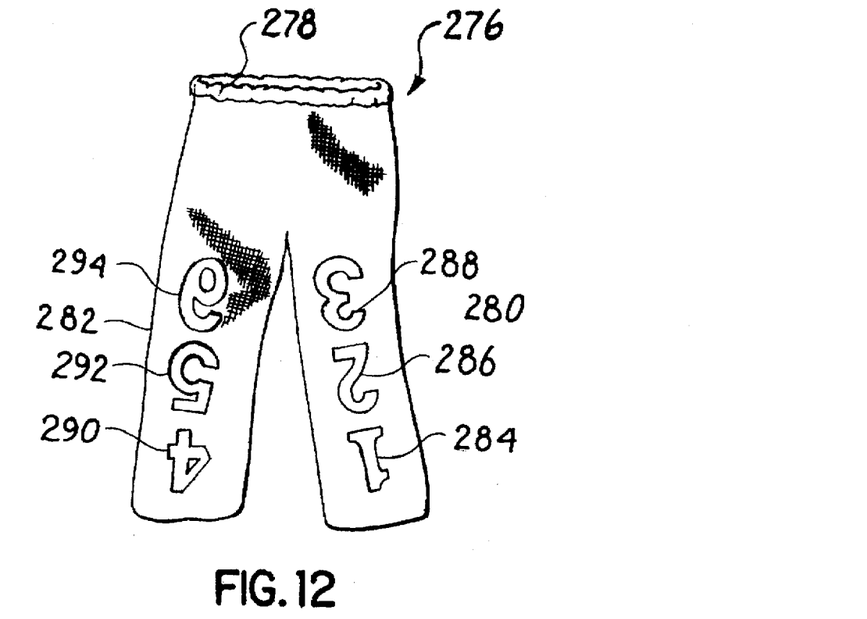
FIG. 12 is a front plan view illustration of a pair of learning enhancing pants in accordance with yet another exemplary embodiment of the present invention; and, FIG. 13 is a front plan view representation of a learning enhancing layette in accordance with still another exemplary embodiment of the present invention.

As shown in FIG. 12 of the drawings, and in accordance with another exemplary embodiment of the present invention, a pair of pants or trousers generally designated by the reference numeral 276 include a waste band 278 and legs 280 and 282. One or more inverted items 284, 286, and 288 are located on leg 280, and one or more inverted items 290, 292, and 294 located on leg 282. It is to be understood that the inverted items 284–294 are located, placed, attached, embossed, inked, painted, printed, dyed, sewn, embroidered, stitched, applied, or otherwise presented on each of the legs 280 and 282 so that, when the child, infant, or the like is wearing the pants, they can look down and see the items right-side-up. The pants 276 may form part of an outfit including a shirt such as shown in FIGS. 6–11 of the drawings, and/or a bib shown in FIGS. 1–5 of the drawings. Shirts, pants, bibs, pajamas, and other garments can be used in various combinations to increase the wearers ability to learn and to facilitate the teaching of numbers, letters, the alphabet, numerical system, words, objects, etc.

Although the inverted items 284–294 shown in FIG. 12 are the numbers or numerals 1–6, it is to be understood that in accordance with the present invention, one or more of a variety of inverted items such as numbers, letters, figures, designs, words, objects, pictorial representations, or combinations thereof can be placed in inverted orientation on one or both of the legs 280 and 282. Further, it is to be understood that the pants 276 may be one in a series or system of pants which present sequential groupings of elements such as numbers or letters, words, pictorial representations, designs, figures, etc. to teach the entire alphabet, numerical system, animals, etc.

Figure 13:
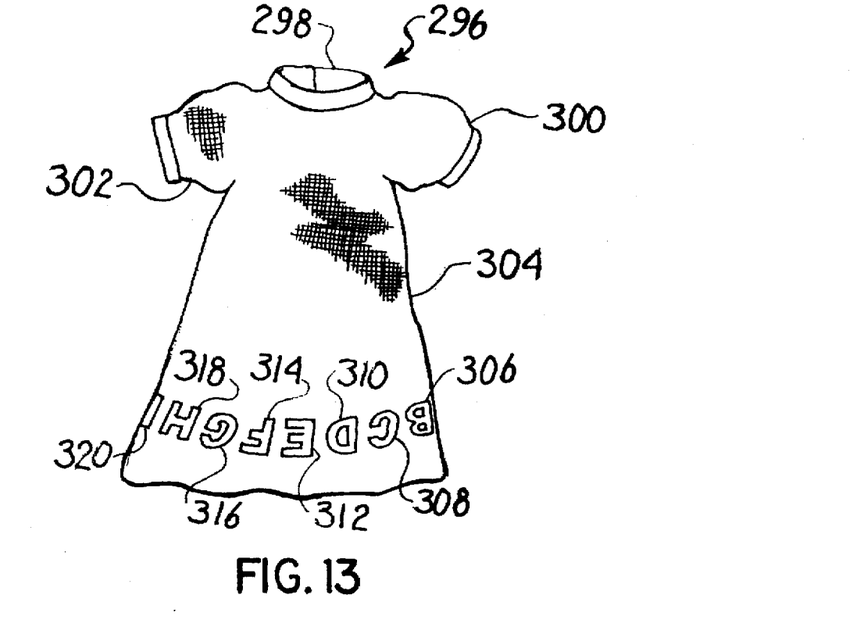

In accordance with still another embodiment of the present invention, as shown in FIG. 13 of the drawings, a layette or child's garment generally designated by the reference numeral 296 includes a collar 298, sleeves 300 and 302, and a skirt portion 304. A plurality of inverted items 306, 308, 310, 312, 314, 316, 318, and 320 are located on the skirt 304 of garment 296 in a position to be viewed by the wearer of the garment. The inverted items 306–320 shown in FIG. 13 are the respective capital letters B–I.

In accordance with one example of the present invention, the garment 296 is reversible, and the inverted items extend around the entire circumference of the lower portion of skirt 304. Such items could be the entire alphabet in capital letters, the entire alphabet in lower case letters, numbers 1–10, barnyard animals, animals commonly found in a zoo, words, and/or the like. The inverted items 306–318 are located, placed, attached, embossed, inked, painted, printed, dyed, sewn, embroidered, stitched, applied, or otherwise presented on skirt portion 304 of garment 296 so that, when the child or infant is wearing the garment, she can look down and see the items right-side-up. Also, it is to be understood that the items may be detachable, replaceable, or movable using releasable fastening elements, fastening or coupling elements such as VELCRO brand filamentary hook and loop type materials. Also, it is to be understood that the garment 296 may be disposable, reusable, washable, waterproof, and formed of a variety of one or more materials.

Also in accordance with the present invention, it is contemplated that the garment 296 may be one of a series or system of garments or part of an outfit including the garment 296 together with pants, and/or a bib each having inverted items thereon to provide an outfit or system for increasing the wearer's ability to learn and to provide a method of teaching the alphabet, numerical system, words, the identification of objects, etc.

In accordance with the present invention, it is also contemplated that other garments, articles of clothing, or accessories including blankets, activity pads or mats, burp pads, shoulder bibs, diapers, short pants, rubber pants, bloomers, one or two piece pajamas, sun suits, coveralls, etc. may have placed or located thereon one or more intentionally inverted items including letters, numbers, words, figures, designs, pictorial representations, combinations thereof or the like, in a position so that, the child or infant wearing or using the article can look down and see the items right-side-up. It is believed that the placement of inverted items on these articles increases the child's ability to learn and facilitates the teaching of the alphabet, numerical system, words, the identification of objects, etc.

Also in accordance with the present invention, a kit is provided having one or more items, means for attaching the items to a garment, article, accessory, or the like, and instructions for attaching the items in an inverted orientation on the article and in a location to be viewed by the wearer so that, he or she can look down and see the items right-side-up. Such a kit can be used to convert a conventional garment, article, or accessory, or the like, to one which will increase the wearer's ability to learn or to facilitate the teaching of the alphabet, numerical system, words, identification of objects, etc.

Although the items 100–118 shown in FIG. 5 of the drawings are shown as separate individual items, it is to be understood that these items may be combined together with two or more on a single piece of cloth, for example, the numbers or numerals 1, 2, and 3,together on a single rectangular piece of cloth which can be attached to the article, garment, accessory, etc. Although it is preferred that all of the items presented on the front of the article, garment, accessory, etc. are inverted, it is contemplated that inverted and non-inverted items may be presented in an organized, structured, or ordered array, pattern, or sequence.

Thus, it will be appreciated that as a result of the present invention, a highly effective, improved garment, article of clothing, accessory, system, series, kit, or the like, is provided by which the principal objective among others is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A system of articles of clothing bearing related educational items for teaching children and learning challenged person comprising:
   a plurality of articles of clothing to be worn sequentially;
   each of said plurality of articles having thereon at least one different inverted educational item, said at least one item selected from a group consisting of a number, a letter, a character, a name, a word, a pictorial representation, and a combination thereof;
   wherein the at least one educational item on each of said articles is categorically related to the at least one educational item on all the other articles of said plurality of articles.

2. The system as recited in claim 1 wherein each of said plurality of articles of clothing is the same kind of article of clothing.

3. The system as recited in claim 2 wherein said articles are bibs.

4. The system as recited in claim 2 wherein said articles are shirts.

5. The system as recited in claim 1 wherein said relationship between said educational items is numeric.

6. The system as recited in claim 1 wherein said relationship between said educational items is alphabetic.

7. The system as recited in claim 1 wherein said relationship between said educational items arises because all of said educational items depict animals.

8. A method of teaching comprising:

sequentially placing each one of a plurality of articles of clothing on a pupil, each article having at least one inverted educational item thereon, with the inverted item appearing rightside-up to the pupil, wherein each of said educational items is categorically related to all other said educational items.

9. A method of teaching as claimed in claim 8, wherein said educational items are numbers and said relationship is a numeric sequence such that when said step of sequentially placing each one of said plurality of articles of clothing on a pupil is performed, said numbers are displayed in numeric sequence.

10. A method of teaching as claimed in claim 8, wherein said educational items are letters and said relationship is an alphabetic sequence such that when said step of sequentially placing each one of said plurality of articles of clothing on a pupil is performed, said letters are displayed in alphabetic sequence.

11. A method of teaching as claimed in claim 8, wherein said educational items are depictions of domesticated animals and said relationship arises from said animals' domestication.

12. A method as claimed in claim 8, wherein said catergorical relationship comprises a sequential relationship and said placing each one of a plurality of articles of clothing on a pupil comprising placing said articles of clothing on a pupil so as to display said educational items according to said sequential relationship.

* * * * *